United States Patent
Yoon

(10) Patent No.: US 10,628,159 B2
(45) Date of Patent: Apr. 21, 2020

(54) PROCESSOR WITH SELECTION CIRCUIT AND SELECTIVELY CONTROLLABLE REGISTER AND METHOD OF OPERATING SAME

(71) Applicant: SAMSUNG ELECTRONICS CO., LTD., Suwon-si, Gyeonggi-Do (KR)

(72) Inventor: Ji Yong Yoon, Seoul (KR)

(73) Assignee: Sansung Electronics Co., Ltd., Suwon-si, Gyeonggi-do (KR)

(*) Notice: Subject to any disclaimer, the term of this patent is extended or adjusted under 35 U.S.C. 154(b) by 134 days.

(21) Appl. No.: 15/718,486

(22) Filed: Sep. 28, 2017

(65) Prior Publication Data

US 2018/0189059 A1    Jul. 5, 2018

(30) Foreign Application Priority Data

Jan. 4, 2017 (KR) .................. 10-2017-0001215

(51) Int. Cl.
*G06F 9/30* (2018.01)
*G06F 13/16* (2006.01)
*G06F 9/38* (2018.01)
*G06F 9/32* (2018.01)

(52) U.S. Cl.
CPC .......... *G06F 9/3013* (2013.01); *G06F 9/3001* (2013.01); *G06F 9/30029* (2013.01); *G06F 9/30189* (2013.01); *G06F 9/3824* (2013.01); *G06F 13/16* (2013.01)

(58) Field of Classification Search
CPC ...... G06F 9/3013; G06F 12/00; G06F 9/3824; G06F 9/30189; G06F 9/3001; G06F 9/30029; G06F 9/3881; G06F 9/3877

USPC .................................. 712/38, 40, 43, 39, 34
See application file for complete search history.

(56) References Cited

U.S. PATENT DOCUMENTS

| | | | |
|---|---|---|---|
| 5,537,562 A * | 7/1996 | Gallup | G06N 3/063 712/234 |
| 7,865,675 B2 | 1/2011 | Paver et al. | |
| 8,683,175 B2 | 3/2014 | Ekanadham et al. | |
| 8,898,448 B2 | 11/2014 | Klingenbrunn et al. | |
| 9,038,073 B2 | 5/2015 | Kohlenz et al. | |
| 9,215,472 B2 | 12/2015 | Orr et al. | |
| 9,363,412 B2 | 6/2016 | Sugimoto et al. | |
| 2003/0190139 A1 | 10/2003 | Ishiguro et al. | |
| 2005/0278512 A1* | 12/2005 | Ehlig | G06F 9/30018 712/228 |
| 2006/0218378 A1* | 9/2006 | Kudo | G06F 9/321 712/208 |

(Continued)

FOREIGN PATENT DOCUMENTS

| | | |
|---|---|---|
| JP | 2007109038 | 4/2007 |
| JP | 2016164752 | 9/2016 |
| KR | 1658397 | 9/2016 |

*Primary Examiner* — Aimee Li
*Assistant Examiner* — Shawn Doman
(74) *Attorney, Agent, or Firm* — Volentine, Whitt & Francos, PLLC

(57) ABSTRACT

A processor includes; a processor core, a register selectively controlled by either external hardware during a first operation mode or the processor core during a second operation mode, and a selection circuit receiving first data provided by the external hardware to the register during the first operation mode and second data provided by the processor core to the register during the second operation mode.

18 Claims, 9 Drawing Sheets

(56) References Cited

U.S. PATENT DOCUMENTS

| | | | |
|---|---|---|---|
| 2007/0198757 A1 | 8/2007 | Kim | |
| 2009/0300629 A1* | 12/2009 | Navon | G06F 9/4881 |
| | | | 718/102 |
| 2011/0041127 A1* | 2/2011 | Kohlenz | G06F 9/4843 |
| | | | 718/100 |
| 2016/0291974 A1* | 10/2016 | Lingam | G06F 9/3013 |

* cited by examiner

1330

PROCESSOR WITH SELECTION CIRCUIT AND SELECTIVELY CONTROLLABLE REGISTER AND METHOD OF OPERATING SAME

This application claims priority from Korean Patent Application No. 10-2017-0001215 filed on Jan. 4, 2017, the subject matter of which is hereby incorporated by reference.

BACKGROUND

The inventive concept relates to a semiconductor device and a method of operating the same.

Generally, in order for software to access data generated by dedicated hardware, such as a hardware accelerator or a hardware preprocessor, a temporary storage space for temporarily storing the data is required. The data generated from the hardware may be recorded in the temporary storage space and then read by the software.

For example, a memory device, such as static random access memory (SRAM), may be disposed between dedicated hardware generating a data stream and software running on a processor and accessing the data stream generated by the dedicated hardware. Thus, the memory device may serve to temporarily store the data stream generated by the dedicated hardware such that the data stream may be read by the software.

However, since such a method of transmitting data between dedicated hardware and software requires an additional memory device, cost increases, and an area for mounting the additional memory device on a circuit is required. In order to solve this problem, there is a need to efficiently exchange data between dedicated hardware and software running on a processor.

SUMMARY

In certain aspects, the inventive concept provides a processor of a semiconductor device and/or method of operating the processor capable of efficiently communicating data between external hardware and software running on a processor without using an additional memory device.

In one aspect, the inventive concept provides a processor of a semiconductor device, including; a processor core, a register selectively controlled by either external hardware during a first operation mode or the processor core during a second operation mode, and a selection circuit receiving first data provided by the external hardware to the register during the first operation mode and second data provided by the processor core to the register during the second operation mode.

In another aspect, the inventive concept provides a method of operating a processor of a semiconductor device, including; detecting an interrupt signal generated by external hardware during a second operation mode in which a register is directly controlled by a processor core of the processor and second data is received, performing context switching from the second operation mode to a first operation mode in which control of the register is controlled by external hardware and first data is received, performing one of a logic, computational and arithmetic operation on the first data stream directly stored in the register by the external hardware without use of an additional memory, and thereafter performing context switching from the first operation mode to the second operation mode.

In another aspect, the inventive concept provides a method of operating a processor of a semiconductor device capable of alternately processing first data received from external hardware using a first operational mode and second data received from a processor core of the processor using a second operational mode. The method includes; while processing the second data, receiving in the processor core an interrupt signal generated by the external hardware, in response to the interrupt signal, context switching from the second operational mode to the first operational mode, during the first operational mode directly receiving the first data from the external hardware in a register of the processor without use of an additional memory, wherein the register is controlled by the external hardware during the first operational mode and by the processor core during the second operational mode.

BRIEF DESCRIPTION OF THE DRAWINGS

The above and other aspects and features of the inventive concept will become more apparent by describing in detail example embodiments thereof with reference to the attached drawings, in which.

DETAILED DESCRIPTION

Hereinafter, embodiments of the inventive concept will be described with reference to the attached drawings.

Figure 1:
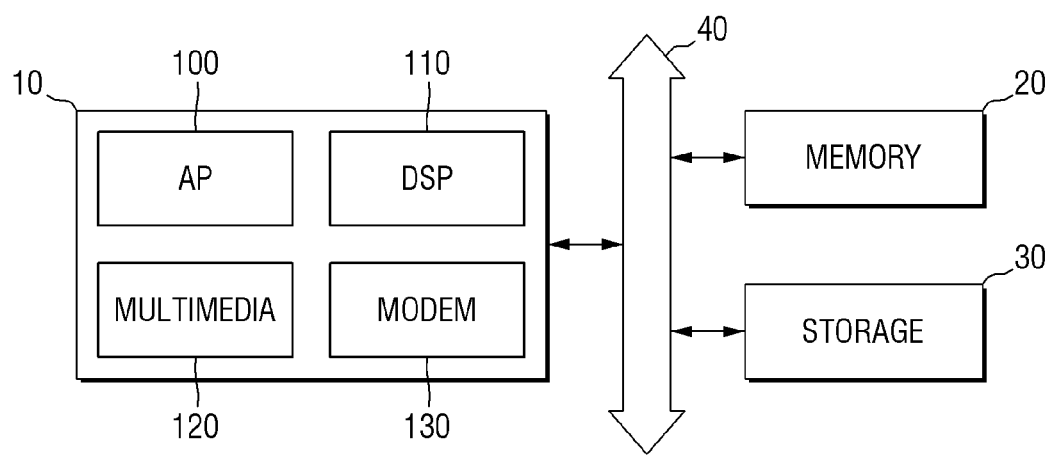
FIG. 1 is a block diagram illustrating a semiconductor system in which a semiconductor device according to an embodiment of the inventive concept is used.

FIG. 1 is a block diagram illustrating a semiconductor system 1 incorporating a semiconductor device according to an embodiment of the inventive concept and/or using a method of operation according to an embodiment of the inventive concept.

Referring to FIG. 1, the semiconductor system 1 includes a system-on-chip 10, a memory device 20, a storage device 30, as well as a bus 40 electrically connecting the system-on-chip 10, memory device 20, and storage device 30.

The system-on-chip 10 illustrated in FIG. 1 includes an application processor (AP) 100, a digital signal processor (DSP) 110, a multimedia processor 120, and a modem 130. Although a system-on-chip having the foregoing general configuration may be used in various embodiments, this particular configuration is merely one example of many different configurations that may be usefully incorporated within various embodiments of the inventive concept according on specific purpose(s) of implementation.

The memory device 20 may include nonvolatile memory (e.g., read only memory (ROM)) and/or volatile memory (e.g., dynamic random access memory (DRAM) or static random access memory (SRAM)), but the scope of the inventive concept is not limited to the type of memory.

The storage device 30 may include a hard disk drive (HDD), a solid state drive (SSD), or the like, but the scope of the inventive concept is not limited to the type of storage device.

Various embodiments of the disclosure to be described later may be applied between general hardware (e.g., dedicated and/or general hardware) and software running on one or more processor(s). However, for the convenience of explanation, hereinafter, the modem 130 provided by the system-on-chip 10 will be described as an example.

Figure 2:
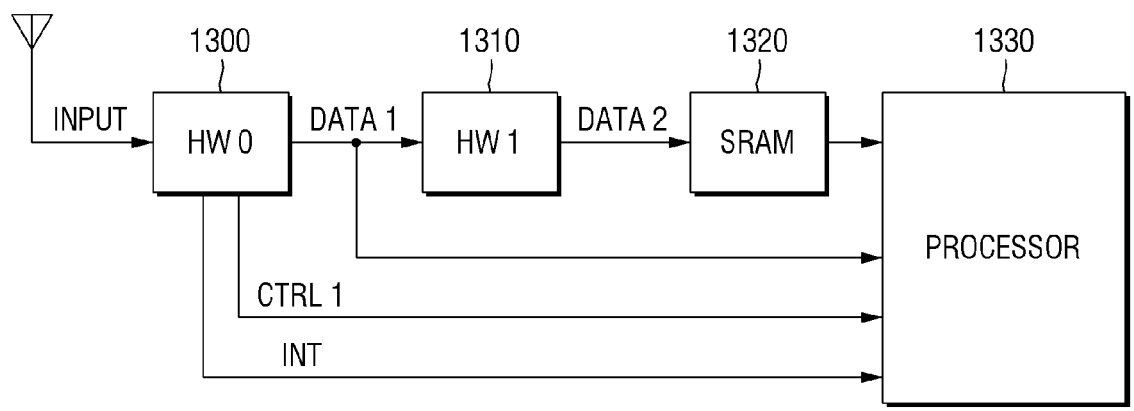
FIG. 2 is a block diagram for illustrating a semiconductor device according to an embodiment of the inventive concept.

FIG. 2 is a block diagram further illustrating in one example the modem 130 of FIG. 1.

Referring to FIG. 2, the modem 130 is further illustrated as including first hardware 1300, second hardware 1310, SRAM 1320, and a processor 1330.

The first hardware 1300 may be, wholly or in part, dedicated hardware for performing specific processing on input information received via an antenna associated with the semiconductor system 1 or a host device incorporating the semiconductor system 1, and providing a corresponding result, hereafter generically referred to as first data (DATA 1). In certain embodiments, the first data (DATA 1) may be communicated (e.g., transmitted and/or received) using one or more conventionally understood "data stream format(s)".

For example, the first hardware 1300 may be dedicated hardware provided to descramble the received input information. Accordingly, the first hardware 1300 may process the input information in order to descramble and provide the first data (DATA 1) in a data stream format.

In response to the first data (DATA 1) provided by the first hardware 1300, the second hardware 1310, which may also be wholly or in part dedicated hardware, may be used to process the first data (DATA 1) and provide corresponding second data (DATA 2).

In certain embodiments, no memory device may be required to communicate data from the first hardware 1300 to the second hardware 1310. However, some additional (or intervening) memory (e.g., SRAM 1320) may be required to communicate data from the combination of the first hardware 1300 and second hardware 1310, according to the particular functionality and capabilities of software running on the processor 1330.

Thus, SRAM 1320 may be used to store the second data (DATA 2) provided by the second hardware 1310 in order to facilitate a processing environment enabling constituent software running on the processor 1330 to further process the second data (DATA 2). However, this approach of using an additional memory (e.g., SRAM 1320) to facilitate the communication of data through various hardware external to the processor 1330 (e.g., first hardware 1300 and second hardware 1310) in a manner compatible with software running on the processor 1330 results in certain costs, such as an increase in the size (or footprint area) of the system-on-chip 10 and/or semiconductor device 1. In order to avoid these costs, certain embodiments of the semiconductor device 1 may directly communicate data, as generated by one or more external hardware, to the processor 1330 without storing the data in an intervening memory.

In order to accomplish this desires result, the first hardware 1300 may be configured to acquire control over a register disposed in the processor 1330 while outputting the first data (DATA 1). This control allows the first hardware 1300 to directly write the first data (DATA 1) to the register of the processor 1330. Acquiring control may be variously provided, but in one embodiment the first hardware 1300 may communicate a first control signal (CTRL 1) and an interrupt signal (INT) to the processor 1330. A detailed description of this approach will be described hereafter with reference to FIGS. 3, 4 and 5.

Figure 3:
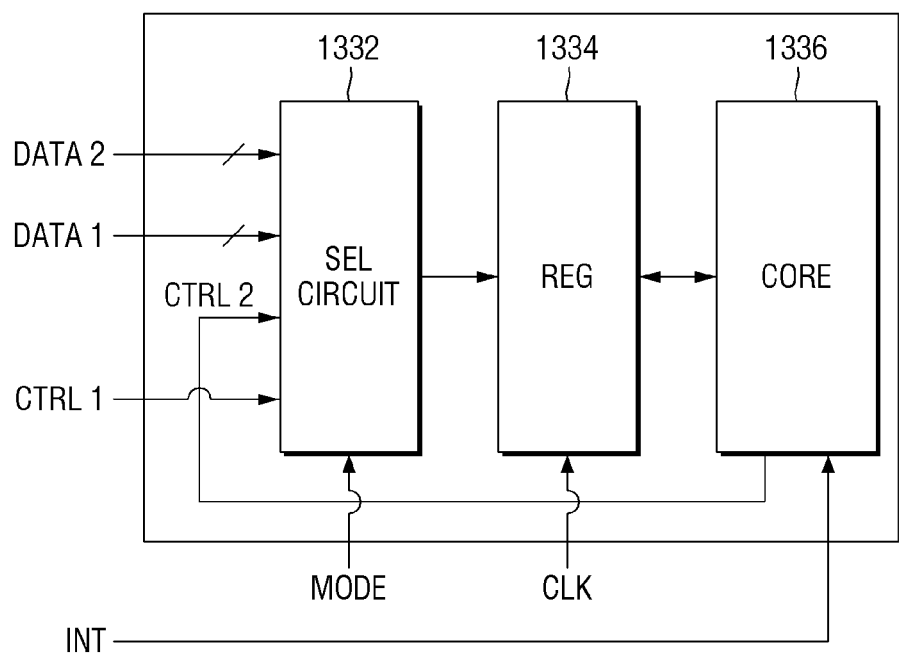
FIG. 3 is a block diagram further illustrating a processor of the semiconductor device according to an embodiment of the inventive concept.

FIG. 3 is a block diagram further illustrating in one example the processor 1330 of FIG. 2 according to an embodiment of the inventive concept.

Referring to FIG. 3 and as described with reference to FIG. 2, the processor 1330 directly receives the first data (DATA 1) from the first hardware 1300. Here, the processor 1330 is illustrated as including a selection circuit 1332, a register 1334, and a processor core 1336.

The selection circuit 1332 receives a mode signal MODE, where the selection circuit 1332 is selectively configured to operate in either a first operation mode or a second operation mode according on the mode signal MODE. In this manner, the selection circuit 1332 may selectively provide either the first data (DATA 1) provided by the first hardware 1300 to the register 1334 while operating in the first operation mode, or the second data (DATA 2) provided by the second hardware 1310 to the register 1334 while operating in the second operation mode. In this regard, it should be noted that the second data (DATA 2) may be selectively provided to the register 1334 further in response to a control signal (CTRL 2) provided by the core 1336.

In the embodiment illustrated in FIG. 3, the register 1334 is synchronously driven in its operation by a clock signal CLK. The register 1334 stores the first data (DATA 1) under the control of the first hardware 1300 during the first operation mode, or stores the second data (DATA 2) under the control of the processor core 1336 in the second operation mode.

The processor core 1336 may directly access the register 1334, and more particularly, the software running on the processor core 1336 may directly access the data stored in the register 1334. In some embodiments of the inventive concept, the processor core 1336 may include an application-specific instruction set processor (ASIP), but the scope of the disclosure is not limited thereto.

Various operation and interoperation among the first hardware 1300, selection circuit 1332, register 1334, and processor core 1336 will be described hereafter.

For example, when the first data (DATA 1) provided by the first hardware 1300 during the first operation mode is directly stored in the register 1334 from the first hardware 1300, the first hardware 1300 may generate the interrupt signal (INT) before providing the first data (DATA 1). When the processor core 1336 operating in the second operation mode recognizes the presentation of the interrupt signal (INT), the processor core 1336 switches from the second operation mode to the first operation mode using an approach referred to as "context switching". In this regard, context switching between data streams or information threads relies on process switching using a virtualized memory (e.g., register 1334). That is, each switched-in data stream or information thread (e.g., DATA 1 and DATA 2)

shares the virtualized memory in relation to a corresponding operation mode (e.g., first operation mode and second operation mode).

Accordingly, when the processor core 1336 completes context switching from the second operation mode to the first operation mode, the first hardware 1300 is allowed to communicate the first control signal CTRL 1 to the selection circuit 1332 in order to acquire control of the register 1334, and thereafter, the first hardware 1300 may write the first data (DATA 1) to the register 1334 via the selection circuit 1332. Thereafter, the processor core 1336 (or software running on the processor core 1336) may perform a logic, computational and/or arithmetic operation on the first data (DATA 1) stored in the register 1334 during the first operation mode.

Thereafter, once the provision of the first data (DATA 1) from the first hardware 1300 is complete and the logic/computational/arithmetic operation performed by the processor core 1336 is complete, the processor core 1336 may control the context switching from the first operation mode back to the second operation mode by communicating the second control signal (CTRL 2) to the selection circuit 1332 in order to again acquire control of the register 1334. Thus, it is possible to communicate data from the first hardware 1300 to software running on the processor core 1336 in this manner without the requirement to use a memory resource beyond the register 1334 already provided in the processor 1330. This allows the semiconductor system 1 of FIG. 1 to be implemented at reduced size and cost.

Figure 4:
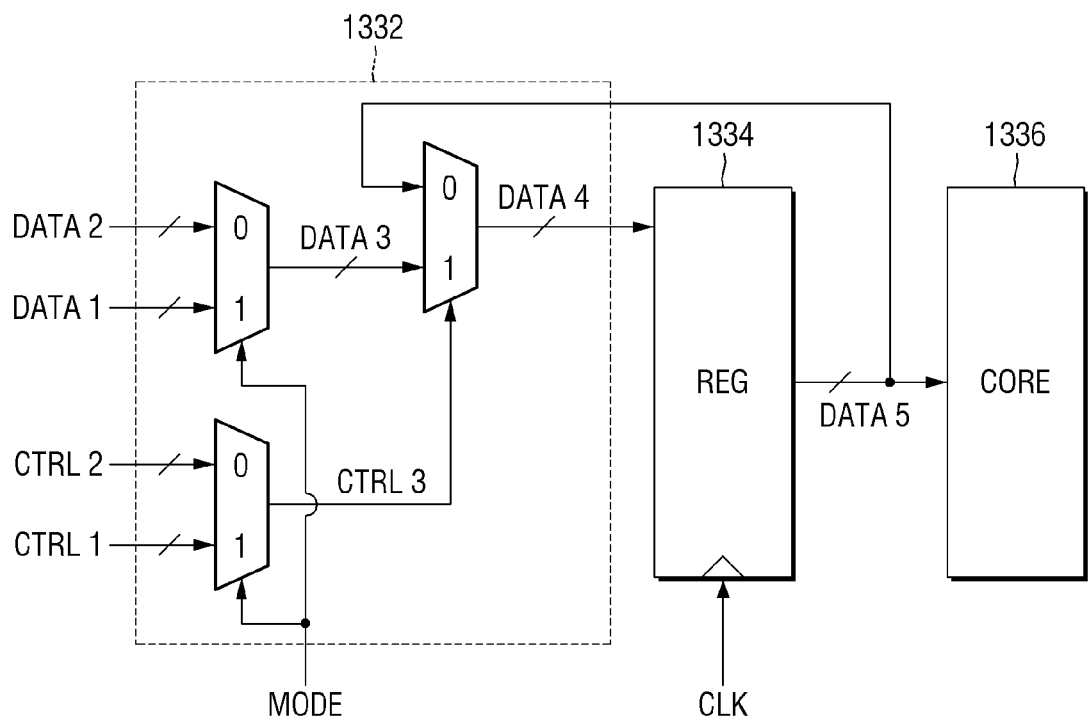
FIG. 4 is a block diagram further illustrating a selection circuit of the semiconductor device according to an embodiment of the inventive concept.

FIG. 4 is a block diagram further illustrating in one example the selection circuit 1332 of FIG. 3 according to an embodiment of the inventive concept.

Referring to FIGS. 1, 2, 3 and 4, the selection circuit 1332 may be implemented using a plurality of multiplexers, e.g., a first multiplexer, a second multiplexer, and a third multiplexer.

The first multiplexer receives the first data (DATA 1) provided by the first hardware 1300 and the second data (DATA 2) provided by some source other than the first hardware 1330 (e.g., the second hardware 1310, processor core 1336, etc.), selects between the first data (DATA 1) and second data (DATA 2) according on the operation mode of the selecting circuit 1332, and outputs third data (DATA 3).

During the first operation mode in which the first hardware 1300 has the control of the register 1334, the first multiplexer selects the first data (DATA 1) and outputs the first data (DATA 1) as the third data (DATA 3). Alternately, during the second operation mode in which the processor core 1336 has the control of the register 1334, the first multiplexer selects the second data (DATA 2) and outputs this second data (DATA 2) as the third data (DATA 3).

The second multiplexer receives the first control signal CTRL 1 provided by the first hardware 1300 and the second control signal CTRL 2 provided by some source other than the first hardware 1300 (e.g., the processor core 1336), selects between the first control signal CTRL 1 and the second control signal CTRL 2 according on the operation mode of the selecting circuit 1332, and outputs a third control signal CTRL 3.

During the first operation mode in which the first hardware 1300 has the control of the register 1334, the second multiplexer selects the first control signal CTRL 1 and outputs this first control signal CTRL 1 as the third control signal CTRL 3. Alternately, during the second operation mode in which the processor core 1336 has the control of the register 1334, the second multiplexer selects the second control signal CTRL 2 and outputs this second control signal CTRL 2 as the third control signal CTRL 3.

The third multiplexer receives the third data (DATA 3) from the first multiplexer as a first input and a feedback data (DATA 5) from the output of the register 1334 as a second input. The third multiplexer also receives the third control signal CTRL 3 from the second multiplexer as a selection signal. Consistent with the selection signal, the third multiplexer provides a fourth data (DATA 4) selected from between the third data (DATA 3) and feedback data (DATA 5) to the register 1334.

Figure 5:
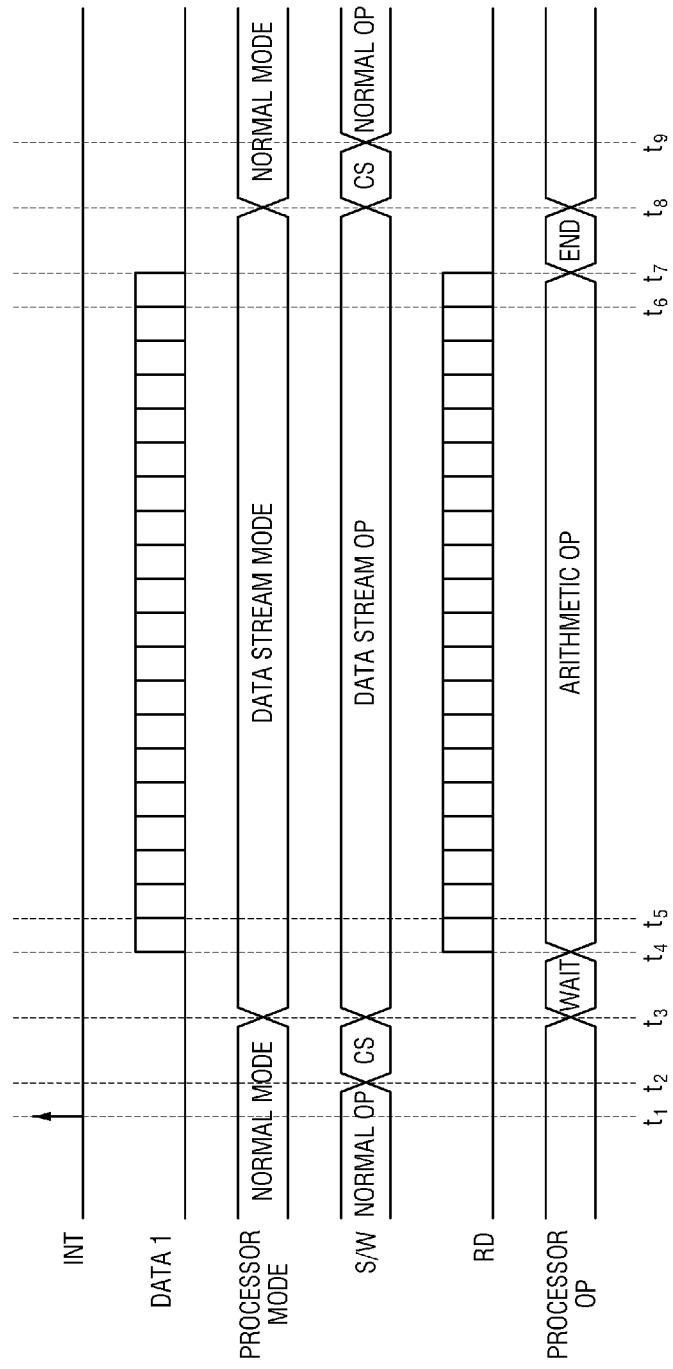
FIG. 5 is a timing diagram illustrating an operation example of the semiconductor device according to an embodiment of the inventive concept.

FIG. 5 is a timing diagram illustrating exemplary timing relationships between various control signals, data signals and operation modes for the semiconductor device 1 of FIGS. 1, 2, 3 and 4 according to various embodiments of the inventive concept.

Referring to FIG. 5, at time t1, the first hardware 1300 generates an interrupt signal (INT) before providing the first data (DATA 1). At time t2, when the processor core 1336 operating in the second operation mode recognizes the interrupt signal (INT), the processor core 1336 switches from the second operation mode (e.g., assumed to be a normal operation mode in the example of FIG. 5) to the first operation mode (e.g., assumed to be a data stream mode in the example of FIG. 5) using a context switching approach and register 1334.

After the switching to the first operation mode at time t3, the processor core 1336 waits (e.g., using a polling technique) for the data transmission start of the first data (DATA 1) from the first hardware 1300.

At time t4, the first hardware 1300 directly transmits the first data (DATA 1) to the register RD (e.g., register 1334) using a recognized data stream format. Specifically, when the processor core 1336 completes switching from the second operation mode to the first operation mode, the first hardware 1300 transmits the first control signal CTRL 1 to the selection circuit 1332 to acquire the control of the register RD, and writes the first data (DATA 1) to the register RD via the selection circuit 1332.

At time t5, the processor core 1336 recognizing the transmission start of the first data (DATA 1), the software running on the processor core 1336 performs a logic/computational/arithmetic operation on the first data (DATA 1) stored in the register RD.

Then, the processor core 1336 recognizing the transmission end of first data (DATA 1) at time t6, the software running on the processor core 1336 completes the logic/computational/arithmetic operation at time t7, and context switches from the first operation mode back to the second operation mode at time t8. Then, at time t9 at which the context switching from the first operation mode to the second operation mode is complete, the processor core 1336 transmits the second control signal CTRL to the selection circuit 1332 to acquire the control of the register RD.

In order to transmit data between the first hardware 1300 and the software running on the processor core 1336 in this manner, it is sufficient to use the register RD already provided in the processor 1330, and there is no need to provide additional memory. Accordingly, it is possible to avoid the costs associated with provision and use of an additional memory.

Figure 6:
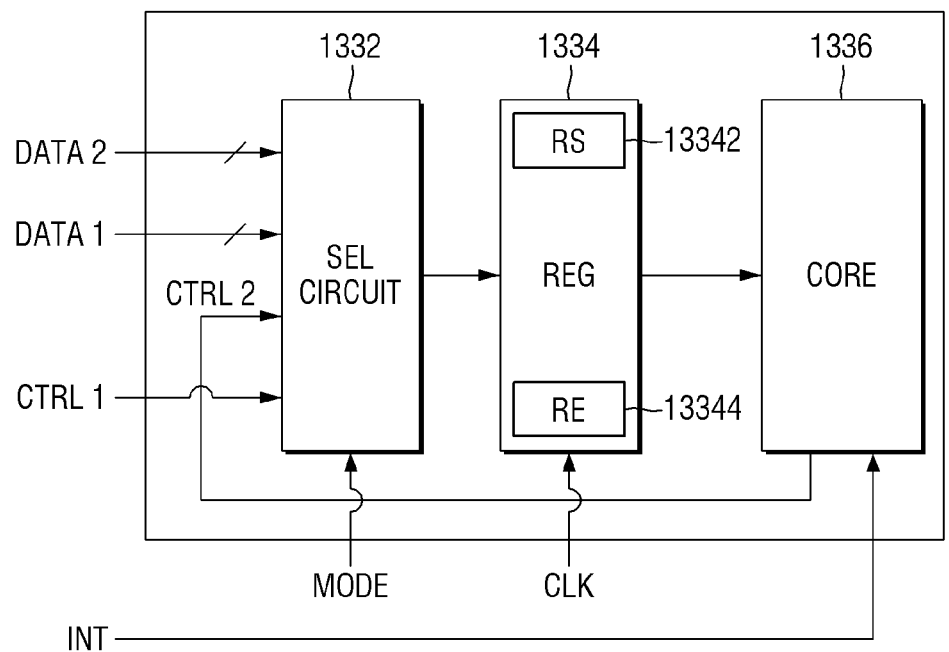
FIG. 6 is a block diagram further illustrating a processor of a semiconductor device according to another embodiment of the inventive concept.
Figure 7:
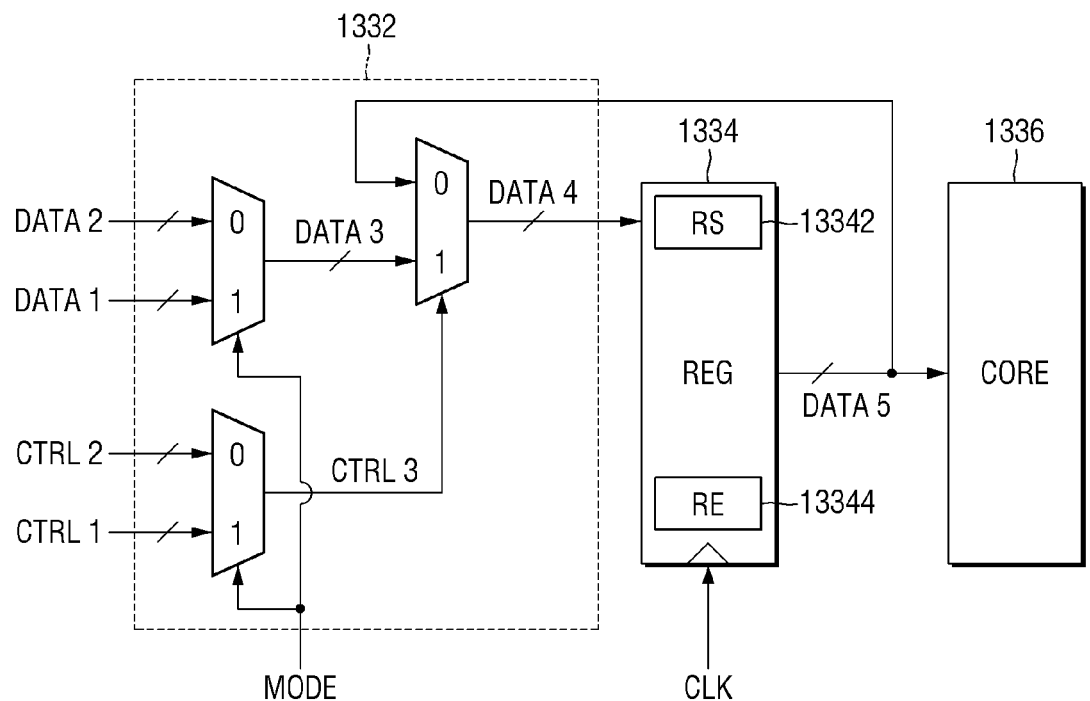
FIG. 7 is a block diagram further illustrating a selection circuit of the semiconductor device according to another embodiment of the inventive concept.

FIG. 6 is a block diagram illustrating the processor 1330 of FIG. 2 according to another embodiment of the inventive concept, and FIG. 7 is a block diagram further illustrating in one embodiment the selection circuit 1332 of FIG. 6.

Referring collectively to FIGS. 6 and 7, the illustrated embodiments differ from those described in relation to FIGS. 3 and 4 in the register 1334 further includes a start register 13342 and an end register 13344.

Again assuming that the first data (DATA 1) is provided from the first hardware 1300 in a data stream format, the start register 13342 may be used to store a first value indicating a start location (e.g., a first address value) for the first data (DATA 1) and the end register 13344 may be used to store a second value indicating an end location (e.g., a second address value) for the first data (DATA 1).

Accordingly, the processor core 1336—as it performs a logic, computational and/or arithmetic operation on the first data (DATA 1) stored in the register 1334 during the first operation mode—may recognize the start location of the data stream using the start register 13342 and the end location of the data stream using the end register 13344.

Figure 8:
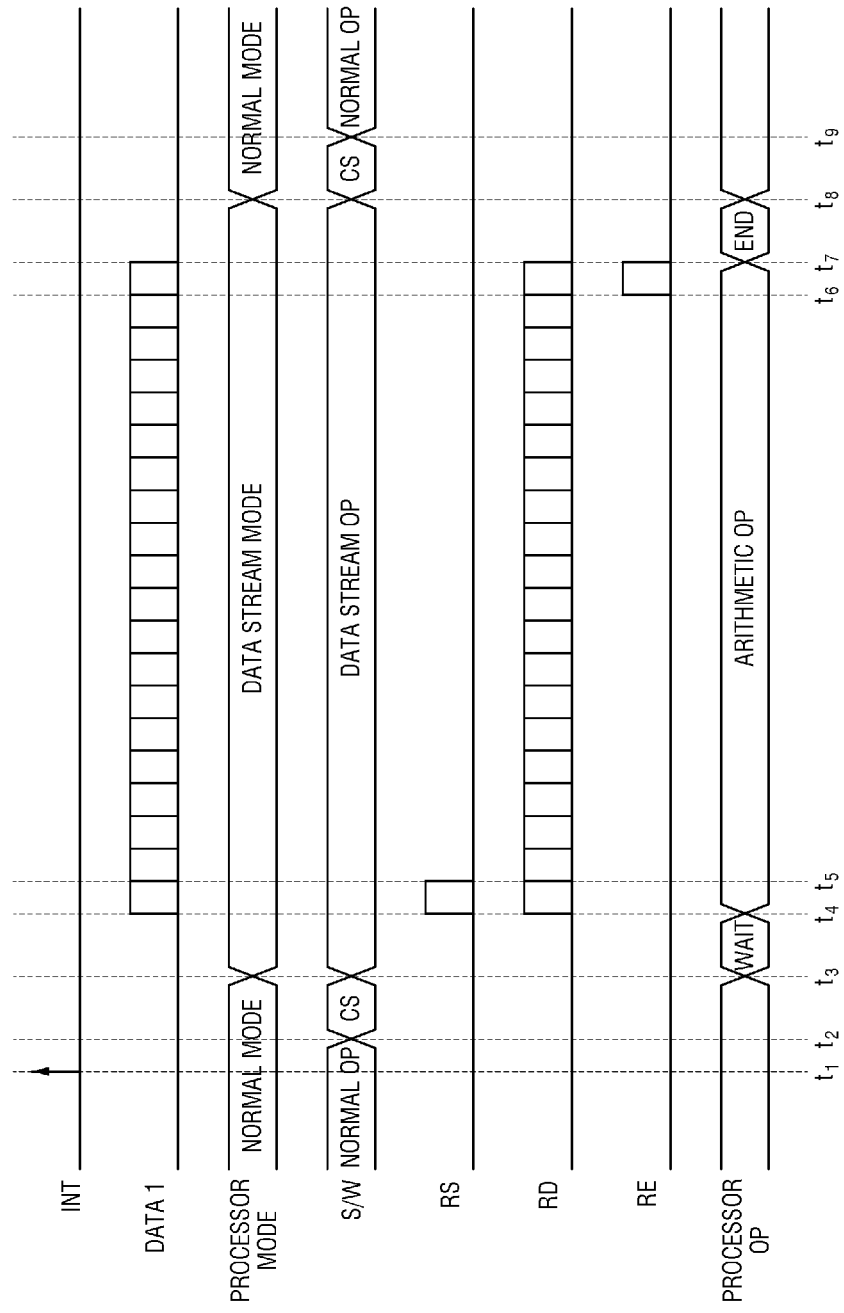
FIG. 8 is a timing diagram illustrating an operation example of the semiconductor device according to another embodiment of the inventive concept.

FIG. 8 is a timing diagram illustrating an operation example for a semiconductor device according to embodiment of the inventive concept.

Referring to FIG. 8, at time t1, the first hardware 1300 generates an interrupt signal (INT) before providing the first data (DATA 1) in a data stream format. At time t2, when the processor core 1336 operating in the second operation mode recognizes the interrupt signal (INT), the processor core 1336 context switches from the second operation mode (e.g., a normal operation mode) to the first operation mode (e.g., a data stream operation mode) using the register RD (e.g., register 1334 of FIGS. 6 and 7).

After the context switching is complete at time t3, the processor core 1336 waits for the transmission start of the first data (DATA 1) from the first hardware 1300. In some embodiments of the inventive concept, the processor core 1336 may wait for the transmission start of the first data (DATA 1) using a polling technique.

At time t4, the first hardware 1300 directly transmits the first data (DATA 1) to the register RD in a data stream format. Specifically, when the processor core 1336 completes the context switching from the second operation mode to the first operation mode, the first hardware 1300 transmits the first control signal CTRL 1 to the selection circuit 1332 to acquire the control of the register RD. Further, the first hardware 1300 writes the first data (DATA 1) to the register RD via the selection circuit 1332.

At time t5, the processor core 1336 polls the start register 13342 and recognizes that the first location value stored in the start register 13342. Accordingly, the processor core 1336 (e.g., software running on the processor core 1336) is able to perform a logic, computational and/or arithmetic operation on the first data (DATA 1) stored in the register RD during the first operation mode.

At time t6, the processor core 1336 polls the end register 13344 and recognizes that the second location value stored in the end register 13344. Accordingly, the processor core 1336 upon completing the logic, computational and/or arithmetic operation at time t7, context switches from the first operation mode to the second operation mode at time t8. Then, at time t9 at which the switching from the first operation mode to the second operation mode is completed, the processor core 1336 transmits the second control signal CTRL to the selection circuit 1332 to acquire the control of the register RD again.

Thus, in order to efficiently communicate data between the first hardware 1300 and software running on the processor core 1336 in this manner, it is sufficient to use the register RD already provided in the processor 1330, and there is no need to provide an additional memory. Accordingly, it is possible to avoid the costs previously referenced.

Figure 9:
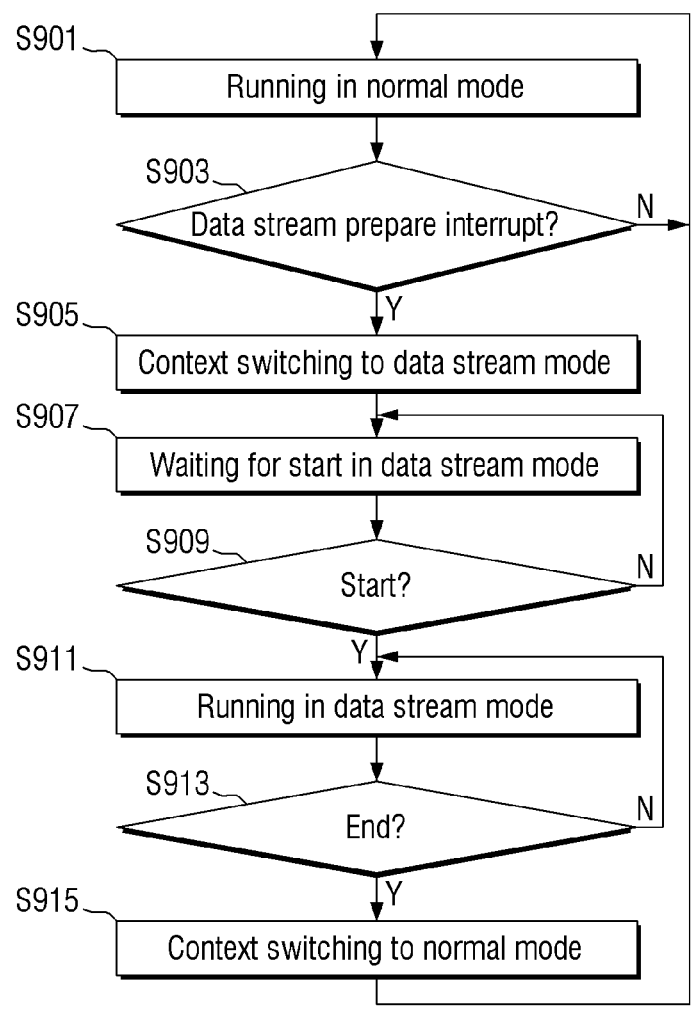
FIG. 9 is a flowchart describing a method of operating the semiconductor device according to an embodiment of the inventive concept.

FIG. 9 is a flowchart describing a method of operating the semiconductor device according to an embodiment of the inventive concept.

In the following description of the method, it is assumed that the processor core 1336 runs in the normal operation mode corresponding to the second operation mode in the aforementioned embodiments (S901). Then, when the processor core 1336 detects an interrupt signal (INT) generated by the first hardware 1300 (S903=Y), the processor core 1336 performs context switching to a data stream operation mode corresponding to the first operation mode in the aforementioned embodiments (S905).

The processor core 1336 waits for the start of transmission of the first data (DATA 1) in the data stream operation mode (S907), recognizes the transmission start (S909=Y), and then performs a logic, computational and/or arithmetic operation on the first data (DATA 1) in the data stream mode (S911).

Thereafter, the processor core 1336 processes the first data (DATA 1) in the data stream mode, recognizes the end of transmission (S913=Y), and then performs context switching back to the normal operation mode (S915).

Figure 10:
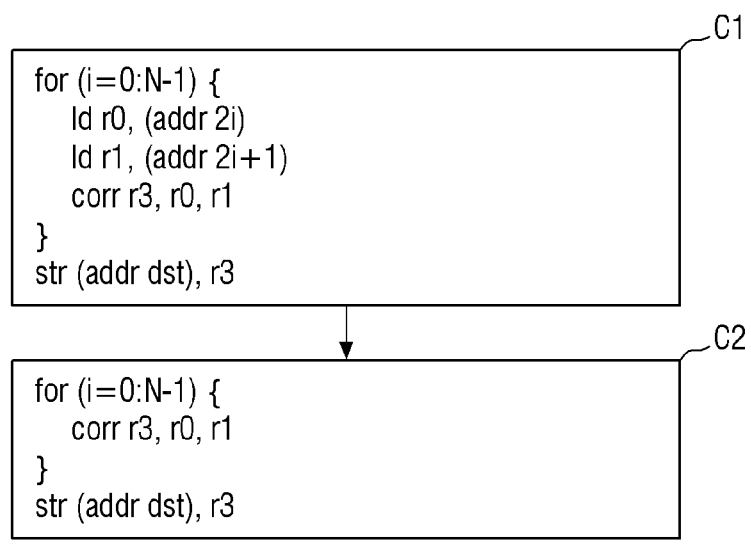
FIG. 10 is a listing of program code segments capable of performing arithmetic operations according to various embodiments of the inventive concept.

FIG. 10 is an example listing of program code that may be used to perform an arithmetic operation according to various embodiments of the inventive concept.

Referring to FIG. 10, a comparison may be made between a first code segment C1 using a conventional scheme and a second code segment C2 using a scheme according to various embodiments of the inventive concept.

In the case of code segment (C1), data existing at an address such as $2i$ or $2i+1$ in a memory is loaded to a register such as r0 or r1 using an instruction such as "ld", and then an arithmetic operation such as "corr" is performed. The operation result thereof is stored at an address such as "dst" in the memory using an instruction such as "store".

In contrast, in the case of code segment C2, in the data stream mode, the data stream generated by the first hardware 1300 is directly updated in a register such as r0 or r1 to be seen in the software running in the processor core 1336. Therefore, in the data stream mode, there is no need to load the data existing in memory into a register using an instruction such as "ld", and an arithmetic operation such as "corr" is performed directly using a register such as r0 or r1. Similarly to the conventional scheme, the operation result thereof may also be stored at an address such as "dst" in memory using an instruction such as "store".

According to various embodiments of the inventive concept, it is possible to efficiently transmit data between hardware (e.g., dedicated hardware) and software running on a processor without using an additional memory device. That is, in order to transmit data between the dedicated hardware and the software running on the processor, it is sufficient to use a register already provided in the processor, and there is no need to provide additional memory. Accordingly, it is possible to avoid the problems of a cost increase and area increase due to the addition of memory.

Although the preferred embodiments of the inventive concept have been disclosed for illustrative purposes, those skilled in the art will appreciate that various modifications, additions and substitutions are possible, without departing from the scope of the disclosure as disclosed in the accompanying claims.

What is claimed is:

1. A processor configured for use in a modem including first hardware and second hardware, and further configured to receive at least one of first data from the first hardware and second data from the second hardware, the processor comprising:
  a processor core configured to directly access data stored in a register, the register being selectively controlled by the first hardware during a first operation mode and the processor core during a second operation mode; and
  a selection circuit directly receiving the first data provided by the first hardware during at least the first operation mode and receiving the second data provided by the second hardware during at least the second operation mode,
  wherein the selection circuit is configured to provide the first data to over the register responsive to a first control signal generated by the first hardware and provided to the selection circuit during the first operation mode, and to provide the second data to the register responsive to a second control signal generated by the processor core and provided to the selection circuit during the second operation mode, and
  wherein the selection circuit comprises
    a first multiplexer configured to receive and select between the first data and the second data according to a selected one of the first operation mode and second operation mode, and to output a selected one of the first data and the second data as third data,
    a second multiplexer configured to receive the first control signal and the second control signal, select between the first control signal and the second control signal according to the selected one of the first operation mode and the second operation mode, and output a selected one of the first control signal and the second control signal as a third control signal, and
    a third multiplexer configured to receive the third data from the first multiplexer and feedback data from the register, select between the third data and the feedback data according to the third control signal, and provide a selected one of the third data and the feedback data as fourth data to the register, wherein the feedback data is stored in the register.

2. The processor of claim 1, wherein the first data is generated by the first hardware only during the first operation mode, and the first data is stored in the register after the first hardware has obtained control of the register from the processor core.

3. The processor of claim 2, wherein the first hardware is configured to generate an interrupt signal and provide the interrupt signal to the processor core before provision of the first data to the selection circuit.

4. The processor of claim 3, wherein upon recognizing the interrupt signal while operating in the second operation mode, the processor core is configured to perform context switching from the second operation mode to the first operation mode.

5. The processor of claim 4, wherein the first hardware provides the first data to the selection circuit only after the processor core completes the context switching.

6. The processor of claim 1, wherein during the first operation mode the processor core is configured to perform at least one of a logic operation, a computational operation and an arithmetic operation on the first data.

7. The processor of claim 6, wherein the first data is provided by the first hardware using a data stream format, and the register includes a start register storing a first location value indicating a start of the first data and an end register storing a second location value indicating an end of the first data.

8. The processor of claim 7, wherein the processor core is configured to recognize the start of a data stream using the first location value and recognize the end of the data stream using the second location value.

9. The processor of claim 1, wherein the processor core includes an application specific instruction set processor (ASIP).

10. A method of operating a processor including a selection circuit, a register and a processor core, the processor being configured for use in a modem including first hardware and second hardware and further configured to receive at least one of first data from the first hardware and second data from the second hardware, the method comprising:
  detecting in the processor core an interrupt signal generated by the first hardware while the processor is operating in a second operation mode,
  during the second operation mode, providing the second data to the register from the selection circuit responsive to a second control signal generated by the processor core and provided to the selection circuit;
  storing the second data provided from the selection circuit in the register;
  performing context switching in the processor core to switch the processor from the second operation mode to a first operation mode responsive to the interrupt signal;
  during the first operation mode, providing the first data to the register from the selection circuit responsive to a first control signal generated by the first hardware and provided to the selection circuit;
  storing the first data provided from the selection circuit in the register;
  using the processor core to perform at least one of a logic operation, a computational operation and an arithmetic operation on the first data stored in the register without use of an additional memory; and thereafter,
  performing context switching in the processor core to switch the processor from the first operation mode back to the second operation mode.

11. The method of claim 10, wherein the first hardware providing the first data to the processor after the processor core completes the context switching from the second operation mode to the first operation mode.

12. The method of claim 10, wherein during the first operation mode the first hardware providing the first data to the processor in a data stream format.

13. The method of claim 12, further comprising:
  storing a first location value indicating a start of the first data in a start register of the register; and
  storing a second location value indicating an end of the first data in an end register of the register.

14. The method of claim 13, further comprising the processor core recognizing the start of the first data using the first location value stored in the start register and recognizing the end of the first data using the second location value stored in the end register.

15. A method of operating a processor including a selection circuit, a register and a processor core, the processor being configured for use in a modem including first hardware and second hardware and further configured to receive at least one of first data from the first hardware and second data from the second hardware, the method comprising:
  using the processor core to detect an interrupt signal generated by the first hardware while the processor is operating in a second operation mode;
  performing context switching in the processor core to switch the processor from the second operation mode to a first operation mode responsive to the interrupt signal;

providing the first data from the selection circuit for storage in the register responsive to a first control signal provided to the selection circuit by the first hardware;

providing the second data from the selection circuit for storage in the register responsive to a second control signal provided to the selection circuit by the processor core;

using the processor core to perform at least one of a logic operation, a computational operation and an arithmetic operation on the first data stored in the register without use of additional memory and thereafter performing context switching in the processor core to switch the processor from the first operation mode back to the second operation mode, wherein the core processor directly accessing the register without use of the additional memory, during the second operation mode the processor core controlling the register, and the second hardware providing the second data to the processor during the first operation mode the first hardware controlling the register, and the first hardware directly providing the first data to the processor.

16. The method of claim 15, comprising providing the first data by the first hardware to the processor according to a data stream format.

17. The method of claim 16, comprising:

storing a first location value indicating a start of the first data in a start register of the register; and storing a second location value indicating an end of the first data in an end register of the register.

18. The method of claim 17, further comprising the processor core recognizing the start of a data stream using the first location value and recognizing the end of the data stream using the second location value.

* * * * *